United States Patent [19]

Ballard et al.

[11] 4,310,904
[45] Jan. 12, 1982

[54] AMBIENT SEA NOISE ELIMINATION METHOD AND APPARATUS

[75] Inventors: Samuel S. Ballard, Hollis; Ronald P. White, Amherst, both of N.H.

[73] Assignee: Sanders Associates, Inc., Nashua, N.H.

[21] Appl. No.: 510,817

[22] Filed: Sep. 30, 1974

[51] Int. Cl.³ .............................................. H04B 11/00
[52] U.S. Cl. ................................... 367/131; 367/135; 367/901; 367/126
[58] Field of Search ............... 340/2, 5 R, 6 R, 16 R; 367/131, 135, 901, 126

[56] References Cited

U.S. PATENT DOCUMENTS

| | | | |
|---|---|---|---|
| 2,529,658 | 11/1950 | Massa | 367/126 X |
| 2,987,700 | 6/1961 | Hawkins | 367/135 |
| 3,319,218 | 5/1967 | Zefting | 367/126 X |

*Primary Examiner*—Richard A. Farley
*Attorney, Agent, or Firm*—Louis Etlinger; Ronald Reichman

[57] ABSTRACT

An ambient sea noise elimination system is disclosed in which the outputs of a directional hydrophone and an omnidirectional hydrophone are filtered and summed such that the effective receiving pattern below approximately 300 Hz is a vertically oriented dipole pattern having a null in the horizontal direction and such that the effective receiving pattern above 300 Hz is a cardioid having its null either pointing upwardly or pointing downwardly in a vertical direction. The option of simple omnicoverage at the high frequencies can also be easily implemented. This system thus takes advantage of the discovery that ambient sea noise under 300 Hz primarily travels in a horizontal direction whereas ambient sea noise above 300 Hz generally travels in a vertical direction. Signal separation is accomplished by a low pass filter connected between the directional hydrophone and a first summing circuit whereas the cardioid receiving pattern is derived by summing the outputs of high pass filters interposed respectively, between the directional hydrophone and a second summing circuit, and between the omnidirectional hydrophone and this second summing circuit. The output of the second summing circuit is coupled as one input to the first summing circuit along with the output of the low pass filter such that the output of the first summing circuit provides acoustic signals having ambient sea noise substantially removed therefrom. For omnicoverage above 300 Hz, a simple high pass filter on the omnichannel is sufficient.

19 Claims, 4 Drawing Figures

AMBIENT SEA NOISE ELIMINATION METHOD AND APPARATUS

This invention relates to acoustic detection and more particularly to a hydrophone array and signal processing circuit in which ambient sea noise is removed from the output signal of the processing circuit.

In the past, detection of undersea signals has been hampered by the presence of ambient sea noise generated primarily from wave action, shipping, or from other conditions existing at the air-sea interface. This background noise has been troublesome because it blankets or masks acoustic signals which are to be detected beneath the surface of the sea. Thus a whole variety of acoustic detection equipment utilized for instance in sonobuoys etc., are affected by the noise generated by the turbulent wave action at the air-sea interface.

It has been found that the ambient sea noise generated beneath the surface of the sea has a directionality which is frequency dependent. It has been discovered that for frequencies below approximately 300 Hz, ambient noise propagates primarily in a horizontal direction whereas above approximately 300 Hz the ambient noise propagation direction appears to take on a vertical orientation. It should be noted that the 300 Hz turning point is not sharp and is only an approximation. However, the rejection of horizontally propagating noise at frequencies somewhere below 300 Hz and the rejection of vertically propagating noise at frequencies somewhere above 300 Hz provides a system for eliminating or at least minimizing the effect of ambient noise on received signals. In general terms, a system rejecting noise propagating in the aforementioned directions at the aforementioned frequencies provides for an increased signal-to-noise ratio.

In the present system ambient sea noise is eliminated or minimized by providing two hydrophones stacked vertically, one with an omnidirectional receiving pattern and the other with a directional receiving pattern, e.g., a vertically oriented pressure gradient hydrophone. The receiving pattern of the directional hydrophone has a null in the horizontal plane at which the directional hydrophone is located. The output from the directional hydrophone is amplified and coupled through a low pass filter set at, for instance, 300 Hz. The low pass filtered signal is then coupled to one input of a first two-input summing circuit.

The output of the omnidirectional hydrophone is amplified and coupled through a high pass filter set at, for instance, 300 Hz. The output of the high pass filter is coupled through a gain adjustment circuit to one input of a second two-input summing circuit. The amplified output of the directional hydrophone is also coupled through a high pass filter set at, for instance, 300 Hz to the second input terminal of the last mentioned summing circuit. This provides an output signal for input signals above 300 Hz such that this output signal as a function of received signal direction takes on the shape of a cardioid. The output signal is therefore said to have an effective receiving pattern of a cardioid. A cardioid pattern is one which is essentially omnidirectional except in one direction at which there is a null. Thus, as used herein, the phrase "effective receiving pattern" refers to the shape of a graph of output voltage vs direction of a received signal, and corresponds to the receiving pattern of a hypothetical acoustic detector having the required directional and frequency characteristics without signal processing.

The output of this last mentioned summing circuit is coupled to the second input terminal of the first mentioned summing circuit such that the output of the first summing circuit has an effective dipole-like or cosine function directional receiving pattern for received signals below 300 Hz. For signals above 300 Hz, the effective receiving pattern has a null in the vertical direction either pointing upwardly or downwardly as desired, depending on the phase relationship between the amplified output signals from the omnidirectional and directional hydrophones.

In a further embodiment, should it be desirable to cancel out only vertically propagating noise, the filtering system must described can be eliminated and the output signals from the directional and the omnidirectional hydrophones summed to produce an effective receiving pattern having a null either upwardly or downwardly in the vertical direction. This system preserves phase information such that the output of this latter described system may be utilized in acoustic detection systems in which phase information is to be preserved. In this latter case while low frequency noise is not discriminated against, noise existing above 300 Hz is discriminated against while at the same time preserving phase information carried by incoming acoustic signals.

In a further embodiment, should it be desirable to cancel out only horizontally propagating noise, below 300 Hz, the filtering system just described is used with the exception that above 300 Hz an omnidirectional pattern is utilized, whereas below 300 Hz a vertically oriented dipole is used.

It is therefore an object of this invention to provide an inexpensive acoustic array and processing system for eliminating ambient sea noise.

It is another object of this invention to provide a method and apparatus for eliminating ambient sea noise by providing a two hydrophone array and signal processing circuitry such that the sum of the outputs from hydrophones produces an effective received pattern with vertically oriented nulls thereby to eliminate acoustic noise signals propagating either upwardly or downwardly in a vertical direction.

It is a still further object of this invention to provide ambient sea noise elimination by providing an array and signal processing circuitry such that below 300 Hz the effective receiving pattern of the array has a null in a horizontal plane while at frequencies above 300 Hz the array has an effective receiving pattern with either a null pointing upwardly or downwardly in a vertical direction or an omnidirectional receiving pattern.

It is yet another object of this invention to provide an ambient sea noise eliminating array and circuitry in which phase information carried by the desired signal is retained.

It is still further object of this invention to provide acoustic detection apparatus in which the signal-to-noise ratio is greatly enhanced.

These and other objects of this invention will be better understood in connection with the following description in view of the appended drawings in which.

Figure 2:
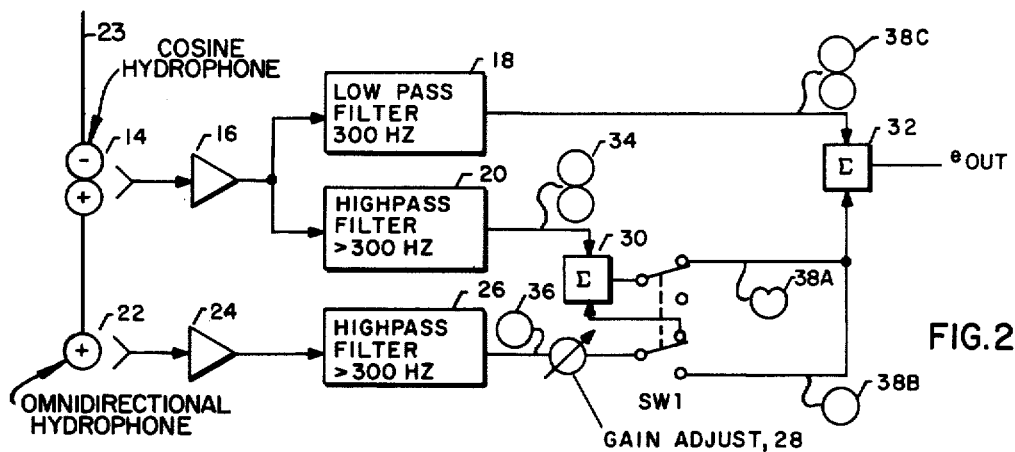
FIG. 2 is a block diagram of an acoustic signal detecting system which eliminates ambient sea noise from a received acoustic signal.
Figure 3:
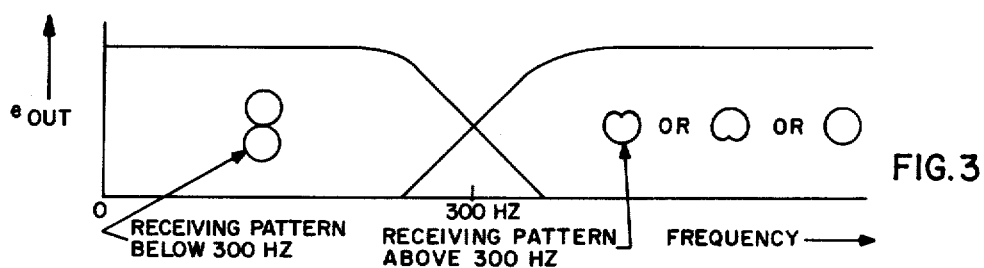
Figure 4:
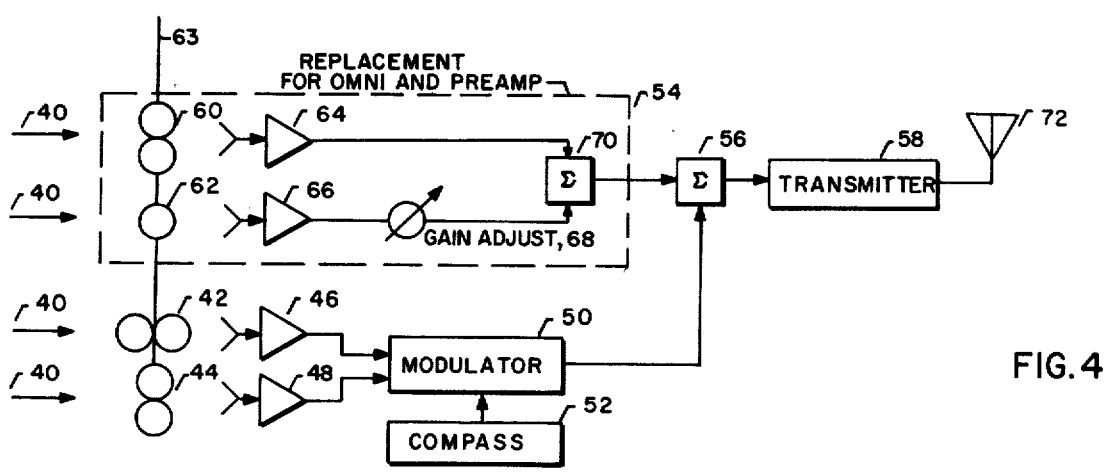

FIG. 3 is a graph of the output voltage from the circuit of FIG. 2 as a function of the frequency of the detected signals, also indicating the effective receiving pattern of the circuit as a function of frequency; and FIG. 4 is a schematic block diagram of an acoustic signal detection system in which ambient sea noise is eliminated from a signal indicating the direction of a received signal, in which phase information carried by the received signal is preserved.

DETAILED DESCRIPTION

Figure 1:
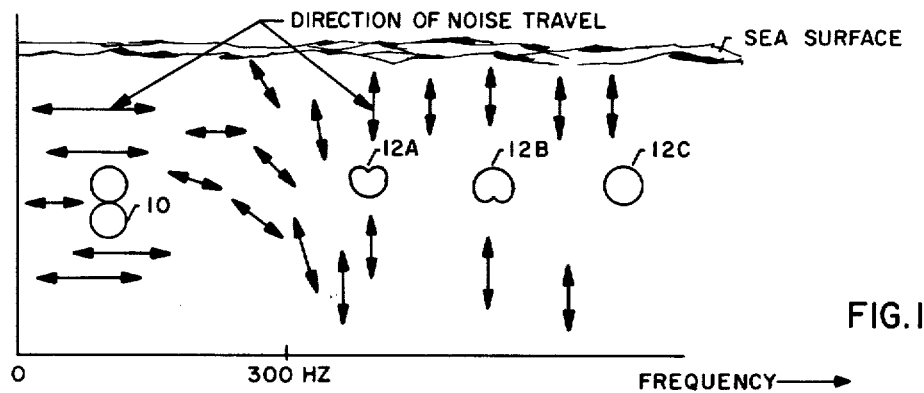
FIG. 1 is a diagrammatic representation of the directionality of ambient sea noise as a function of frequency.

Referring now to FIG. 1, the directionality of ambient sea noise as a function of frequency is diagrammatically illustrated. It is this characteristic which permits noise discrimination by the subject hydrophone array and processing circuitry. As can be seen from the double ended arrows, below approximately 300 Hz the direction of propagation of the noise is in a horizontal direction. In a range $\pm \approx 150$ Hz centered around 300 Hz the propagation direction of the ambient noise changes from a horizontal direction to a vertical direction such that between 300 and 800 Hz the ambient noise propagation changes to a vertical direction.

Ambient noise is basically a function of the shipping density and the sea state condition existing at the air-sea interface. With respect to the amplitude of the ambient noise condition it will be appreciated that as the sea state increases the high frequency ambient noise level increases. Frequencies where ambient noise is dominated by shipping is relatively independent of sea state. Thus, while it is desirable to eliminate low frequency noise, it is oftentimes more desirable to eliminate the high frequency noise due to its rather sharp dependence on the sea state condition.

It will be seen, therefore, that it is desirable to provide a hydrophone array with the dipole receiving pattern illustrated at 10 for ambient noise having frequency below approximately 300 Hz, and the receiving pattern illustrated by the pattern 12a or 12b for frequencies above approximately 300 Hz. Where the particular acoustic processing system is not sensitive to high frequency noise or where the presence of high frequency noise is unimportant, the omnidirectional pattern illustrated at 12c may be preferred. It will be appreciated that the dipole pattern is basically a pattern which establishes a null in a horizontal plane, e.g., a cosine function pattern; while the pattern 12a or 12b is a receiving pattern having a null either vertically upward or downward. This may conveniently be a cardioid pattern which also preserves phase information carried by signals which are to be detected.

With these particular patterns it will be appreciated that noise signals can be eliminated or at least minimized. An extremely low cost and simple system for generating these patterns is illustrated in FIG. 2 involving the use of only two relatively low cost hydrophones.

Referring now to FIG. 2, a hydrophone having a dipole or cosine receiving characteristic is illustrated by cosine pattern 14. A hydrophone having such a receiving pattern is available from Sanders Associates, Inc. as model no. SSQ/53 dipole hydrophone. The output of this hydrophone is coupled through a preamplifier 16 in parallel to both a low pass filter 18 and a high pass filter 20. These filters may be of conventional design and in the case of the low pass filter, this filter has a high frequency cut-off of approximately 300 Hz. With respect to the high pass filter 20, the low frequency cut-off is between 300 and 800 Hz, although it could have a 300 Hz low frequency cut-off or indeed an even lower cut-off frequency.

An omnidirectional hydrophone 22 of conventional design is provided and located either directly below the directional hydrophone 14 as illustrated or directly above it. These hydrophones may be suspended and spaced by attachment to a line 23. The omnidirectional hydrophone is conventional and a conventional hydrophone of this type is manufactured by the Clevite Company, Model No. Ch-17. The output of this hydrophone is connected through a preamplifier 24 of a conventional design to a conventional high pass filter 26 which in one embodiment has a low frequency cut-off of between 300 and 800 Hz. It will be appreciated that the cut-off frequencies of filters 18, 20 and 26 may be adjusted to suitably surround the 300 Hz region, and that there is no limitation intended by the 300 Hz turning point. It is, however, important to note that in the vicinity of a readily ascertainable frequency, the noise direction does change.

The output from high pass filter 26 is coupled to a variable gain adjust device 28 which may be a conventional potentiometer. The output from the variable gain adjust device 28 and high pass filter 20 is switched by a DDT switch SW$_1$ either to a conventional summing network 30 or a second conventional summing network 32. The output of summing network 30 is coupled to the second summing network 32 which sums this signal and the signal from low pass filter 18. When high frequency noise is not a problem and an omnidirectional pattern is preferred for frequencies above 300 Hz the output of the gain adjust circuit may be switched directly to summing network 32 by switch SW$_1$.

In operation, low frequency signals from the directional hydrophone 14 are amplified by the preamplifier 16 and passed by the low pass filter 18. These signals are then coupled to summing network 32 which provides an output pattern, 38C which approximates the aforementioned dipole pattern, there being no output from summing unit 30. The presence of high frequency signals, e.g., those above 300 Hz, results in an output from both high pass filter 20 and high pass filter 26. The effective receiving pattern from these filters is illustrated by the patterns 34 and 36. The combination of these effective receiving patterns in summing network 30 results in a cardioid type receiving pattern such as that illustrated by pattern 38A. The shape of the pattern and degree of null can be adjusted by gain adjust device 28 such that any of a variety of cardioid patterns can be produced. This pattern then forms the effective receiving pattern for high frequency signals. When this signal is summed at summing network 32, since the low frequency signals are eliminated, the effective receiving pattern is the aforementioned cardioid. The null in this case is pointed vertically upward because of the in phase relationship between the output signals from amplifiers 16 and 24 and because of the phase relationships of the hydrophone patterns as illustrated by the "+" and "−" sign notations. Should the phase relationship be reversed, either by inverting the directional hydrophone or by arranging the amplifiers such that their outputs are 180° out of phase, then the cardioid would have a downwardly pointing null, thereby to eliminate noise reflected from the sea floor.

Referring now to FIG. 3, $e_{out}$ is graphed against frequency. As can be seen the two curves cross at approximately 300 Hz. To the left of the 300 Hz cross-over the effective receiving pattern is that illustrated by the dipole pattern. To the right of the 300 Hz cross-over the effective receiving pattern is either one or the other of the cardioid patterns or the omnipattern. What has therefore been provided by the network illustrated in FIG. 2, is an extremely simple inexpensive hydrophone array and processing circuit for eliminating ambient sea noise from signals transmitted to any follow-on processing circuits. This circuit therefore has universal applicability for all underwater acoustic sensing systems including a wide variety of sonobuoys and underwater communication systems utilizing acoustic links.

One such system, in which phase information carried by the incoming signal must be preserved, can utilize the general concept of providing a cardioid receiving pattern for elimination of high frequency noise. As pointed out hereinbefore, the high frequency noise is more acutely dependent on sea state and therefore is somewhat more troublesome than the low frequency noise. Because in this case it is important that phase information be preserved, high pass and low pass filtering described hereinbefore are eliminated. The removal of this filtering, however, does not remove the effective cardioid pattern produced and therefore ambient sea noise above approximately 300 Hz can quite easily be eliminated from the system.

Referring now to FIG. 4, one half of a system for detecting underwater signals and providing signals indicating the direction of these signals is illustrated. Incoming signals are illustrated by arrows 40 which are detected by directional hydrophones diagrammatically illustrated by the receiving patterns 42 and 44. The receiving patterns approximate the cosine function and are orthogonally oriented. The output signals from the hydrophones generating patterns 42 and 44 are amplified by preamplifiers 46 and 48, respectively, with the outputs from these preamplifiers being coupled to a modulator 50 which encodes the direction of the received signals 40 and compares it to a local compass heading generated by compass 52. The output from the modulator 50 is then compared to a signal from what is effectively an omnidirectional hydrophone diagrammatically illustrated by the dotted box 54. The signals from the devices 50 and 54 are summed at 56 and transmitted by a transmitter 58 to a remote location where they are decoded and the angle of the incoming signal 40 read out. A system such as the type described in which modulator 50, compass 52, omnidirectional hydrophone apparatus 54, summing circuit 56 and transmitter 58 are utilized to transmit the direction of incoming signals is described in U.S. patent application Ser. No. 19,979 filed Mar. 16, 1970 entitled, "Underwater Direction Signal Processing System", now U.S. Pat. No. 3,870,989 invented by Alfred L. Mallett and assigned to the assignee of this patent application. This patent application is incorporated herein by reference. In this system, an underwater direction finding system includes a sonobuoy incorporating a pair of directional hydrophones, a compass for providing a reference to the earth's magnetic coordinates and a signal processing system aboard an airplane or ship for providing a read out of the direction incoming acoustic signals. The signal processing system aboard the ship or plane selects one of the received transmitted signals for processing and converts the signal into a signal identical to that generated by the hydrophones. This signal is then processed to provide the direction of the received acoustic signals referenced to the earth's magnetic coordinates.

The method for detecting the direction of received acoustic signals as well as the circuitry are described in the aforementioned patent application. As pointed out, the signals from directional hydrophones 42 and 44 are finally compared at a summing device 56 with the output from an omnidirectional hydrophone. In order to eliminate ambient sea noise above approximately 300 Hz, the omnidirectional hydrophone called for in the above patent application is replaced with the circuit illustrated in dotted box 54. This comprises a vertically oriented directional hydrophone 60 of the type having a cosine receiving pattern and a conventional omnidirectional hydrophone 62 located either immediately above or below the directional hydrophone and in vertical alignment therewith hydrophones 42, 44, 60 and 62 may be suspended and spaced by attachment to a line 63. The outputs of these latter two hydrophones are amplified by a conventional preamplifying circuits 64 and 66. The output of preamplifier 66 is coupled through a conventional gain adjust circuit 68 such as that described and is applied to one input terminal of a two-terminal summing network 70. The output from preamplifier 64 is coupled to the other input terminal of this summing network. The gain adjust circuit 68 is adjusted such that there is no back lobe or cusp associated with the cardioid pattern produced when the outputs of preamplifiers 64 and 66 are summed at 70. This is satisfied when the gain of the omni-preamplifier 66 is equal to the gain of the cosine preamplifier 64 for a signal that is arriving at the cosine hydrophone 60 from the vertical direction. The output of summing network 70 is coupled to one input terminal of summing network 56 such that information transmitted by transmitter 58 out through antenna 72 is devoid of noise components having frequencies above approximately 300 Hz.

What has therefore been described is an example of a system utilizing the concept of ambient noise elimination in which the finding of the directionality of the noise makes possible the ambient noise rejection.

Although a specific embodiment to the invention has been described in considerable detail for illustrative purposes, many modifications will occur to those skilled in the art. It is therefore desired that the protection afforded by Letters Patent be limited only the true scope of the appended claims.

We claim:

1. A method for minimizing ambient subsurface noise from acoustic signals propagating beneath the surface of the sea comprising the steps of
    detecting acoustic signals at a first location with a directional hydrophone having a null in a horizontal plane and providing a first signal corresponding to acoustic signals detected by said directional hydrophone;
    detecting acoustic signals at a second location vertically spaced from said first location with an omnidirectional hydrophone and providing a second signal corresponding to acoustic signals detected by said omnidirectional hydrophone; and
    summing said first and second signals thereby to produce a signal in which vertically travelling subsurface noise is minimized.

2. The method of claim 1 and further including adjusting the amplitude of said second signal, thereby to change the effective receiving pattern associated with the summed signals.

3. A method for minimizing ambient subsurface noise from acoustic signals propagating beneath the surface of the sea comprising the steps of detecting acoustic signals at a first location with a directional hydrophone having a null in a horizontal plane and providing a first signal corresponding in amplitude to the amplitude of acoustic signals detected by said directional hydrophone;

detecting acoustic signals at a second location vertically spaced from said first location with an omnidirectional hydrophone and providing a second signal corresponding in amplitude to the amplitude of acoustic signals detected by said omnidirectional hydrophone, removing frequency components of said first signal above a predetermined frequency, so as to form a third signal, removing frequency components of said first signal below a predetermined frequency so as to form a fourth signal, removing frequency components of said second signal below a predetermined frequency so as to form a fifth signal, summing said fourth and fifth signals to form a sixth signal; and summing said third and sixth signals thereby to form an output signal in which both horizontal and vertical subsurface noise is minimized.

4. The method of claim 3 wherein all of said predetermined frequencies are in the vicinity of a frequency marking the transition in propagation direction of said subsurface noise from a horizontal to a vertical direction.

5. The method of claim 4 wherein said predetermined frequency is 300 Hz.

6. Apparatus for minimizing ambient subsurface noise from acoustic signals propagating beneath the surface of the sea comprising:

means for detecting acoustic signals at a first location with a directional hydrophone having a null in a horizontal plane and providing a first signal corresponding to acoustic signals detected by said directional hydrophone;

means for detecting acoustic signals at a second location vertically spaced from said first location with an omnidirectional hydrophone and providing a second signal corresponding to acoustic signals detected by said omnidirectional hydrophone; and means for summing said first and second signals thereby to produce a signal in which vertically travelling subsurface noise is minimized.

7. Apparatus in accordance with claim 6 and further including means for adjusting the amplitude of said second signal, thereby to change the effective receiving pattern associated with the summed signals.

8. Apparatus for minimizing ambient subsurface noise from acoustic signals propagating beneath the surface of the sea comprising:

means for detecting acoustic signals at a first location with a directional hydrophone having a null in a horizontal plane and providing a first signal corresponding in amplitude to the amplitude of acoustic signals detected by said directional hydrophone;

means for detecting acoustic signals at a second location vertically spaced from said first location with an omnidirectional hydrophone and providing a second signal corresponding in amplitude to the amplitude of acoustic signals detected by said omnidirectional hydrophone, means for removing frequency components of said first signal above a predetermined frequency, so as to form a third signal;

means for removing frequency components of said first signal below a predetermined frequency so as to form a fourth signal;

means for removing frequency components to said second signal below a predetermined frequency so as to form a fifth signal;

means for summing said fourth and fifth signals to form a sixth signal; and means for summing said third and sixth signals thereby to form an output signal in which both horizontal and vertical subsurface noise is minimized.

9. Apparatus in accordance with claim 8 wherein all of said predetermined frequencies are in the vicinity of a frequency marking the transition in propagation direction of said subsurface noise from a horizontal to a vertical direction.

10. Apparatus in accordance with claim 9 wherein said predetermined frequency is 300 Hz.

11. Apparatus for detecting underwater acoustic signals and for providing an output signal, in which the effects of ambient noise are minimized comprising:

a directional hydrophone having a dipole receiving pattern;

first amplifier means for amplifying the output signal from said directional hydrophone to produce a first signal;

an omnidirectional hydrophone;

second amplifier means for amplifying the output signal from said omnidirectional hydrophone to produce a second signal;

a low pass filter;

means for applying said first signal to the input of said low pass filter;

a first high pass filter;

means for applying said first signal to the input of said first high pass filter;

a second high pass filter;

means for applying said second signal to the input of said second high pass filter;

first summing means;

means for coupling the output signals from said first and second high pass filters to said first summing means;

second summing means; and means for applying the output signal from said low pass filter and the output signal of said first summing meand to said second summing means.

12. The apparatus of claim 11 and further including means for vertically spacing said hydrophones.

13. The apparatus of claim 12 wherein the cut-off frequencies for said filters lie within a predetermined range of frequencies centered about the frequency in the vicinity of which the propagation of ambient noise changes direction from horizontal to vertical.

14. The apparatus of claim 13 wherein said last mentioned frequency is 300 Hz.

15. The apparatus of claim 13 wherein the output signals from said first and second amplifying means are in phase and said hydrophones are polarized such that the polarity of the lower lobe of said directional hydrophone is the same as that of said omnidirectional hydrophone, whereby the resulting effective receiving pattern for said apparatus for frequencies above said last mentioned frequency has an upwardly pointing null.

16. The apparatus of claim 13 and further including means for adjusting the amplitude of the output signal from said second high pass filter to eliminate any back lobes from the effective receiving pattern of the output signal from said first summing means.

17. Apparatus for use in detecting underwater acoustic signals comprising:
   a directional hydrophone having a receiving pattern with a null in a horizontal plane;
   first means for amplifying the output signal from said directional hydrophone;
   an omnidirectional hydrophone;
   second means for amplifying the output signal from said omnidirectional hydrophone;
   means for mounting said hydrophones in spaced vertical alignment; and
   means for summing the output signals from said first and second amplifying means, whereby ambient sea noise traveling in a vertical direction is eliminated from the output of said summing means.

18. The apparatus of claim 17 and further including means for adjusting the amplitude of the output signal from said second amplifying means to eliminate any back lobes from the effective receiving pattern of the output signal from said summing means.

19. The apparatus of claim 17 wherein the summed signals are in phase and wherein said hydrophones are polarized such that the polarity of the lower lobe of said directional hydrophone is the same as that of said omnidirectional hydrophone.

* * * * *